US009535771B2

(12) United States Patent
Watson et al.

(10) Patent No.: US 9,535,771 B2
(45) Date of Patent: *Jan. 3, 2017

(54) MEMORY MANAGEMENT METHODS AND SYSTEMS

(71) Applicant: Apple Inc., Cupertino, CA (US)

(72) Inventors: Matthew G. Watson, San Francisco, CA (US); James Michael Magee, Orlando, FL (US)

(73) Assignee: Apple Inc., Cupertino, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 13/948,990

(22) Filed: Jul. 23, 2013

(65) Prior Publication Data

US 2014/0059571 A1  Feb. 27, 2014

Related U.S. Application Data

(60) Continuation of application No. 12/909,751, filed on Oct. 21, 2010, now Pat. No. 8,516,198, which is a
(Continued)

(51) Int. Cl.
*G06F 12/00* (2006.01)
*G06F 9/54* (2006.01)
(Continued)

(52) U.S. Cl.
CPC .............. *G06F 9/542* (2013.01); *G06F 9/485* (2013.01); *G06F 9/5016* (2013.01);
(Continued)

(58) Field of Classification Search
CPC ...... G06F 12/00; G06F 12/0815; G06F 12/10; G06F 12/12
(Continued)

(56) References Cited

U.S. PATENT DOCUMENTS 6,658,652 B1  12/2003  Alexander et al.
6,678,805 B1   1/2004  Corduneanu et al.
(Continued)

FOREIGN PATENT DOCUMENTS

EP         1 492 006 A1   12/2004
WO    WO 2005/059750 A1    6/2005

OTHER PUBLICATIONS

PCT International Search Report and Written Opinion for PCT International Appln No. PCT/US2007/026074, mailed on Jun. 12, 2008 (13 pages).

(Continued)

*Primary Examiner* — Tuan Thai
(74) *Attorney, Agent, or Firm* — Blakely, Sokoloff, Taylor & Zafman LLP

(57) ABSTRACT

A method and an apparatus for determining a usage level of a memory device to notify a running application to perform memory reduction operations selected based on the memory usage level are described. An application calls APIs (Application Programming Interface) integrated with the application codes in the system to perform memory reduction operations. A memory usage level is determined according to a memory usage status received from the kernel of a system. A running application is associated with application priorities ranking multiple running applications statically or dynamically. Selecting memory reduction operations and notifying a running application are based on application priorities. Alternatively, a running application may determine a mode of operation to directly reduce memory usage in response to a notification for reducing memory usage without using API calls to other software.

33 Claims, 9 Drawing Sheets

Related U.S. Application Data division of application No. 11/620,688, filed on Jan. 7, 2007, now Pat. No. 7,827,358.

(51) Int. Cl.
  *G06F 9/48* (2006.01)
  *G06F 9/50* (2006.01)

(52) U.S. Cl.
  CPC ...... *G06F 9/5022* (2013.01); *G06F 2209/482* (2013.01); *G06F 2209/508* (2013.01)

(58) Field of Classification Search
  USPC ................................ 711/100, 135, 154, 200
  See application file for complete search history.

(56) References Cited

U.S. PATENT DOCUMENTS

| | | | |
|---|---|---|---|
| 7,185,155 B2* | 2/2007 | Sechrest | G06F 12/122 711/136 |
| 7,472,247 B2 | 12/2008 | Vitanov et al. | |
| 8,046,556 B2 | 10/2011 | Hassan | |
| 8,108,632 B2 | 1/2012 | Van Riel et al. | |
| 2004/0268357 A1* | 12/2004 | Joy | H04L 29/06 718/105 |
| 2005/0149940 A1* | 7/2005 | Calinescu | G06F 9/5061 718/104 |
| 2006/0059156 A1 | 3/2006 | Janes et al. | |
| 2007/0006223 A1 | 1/2007 | Wetherly et al. | |
| 2007/0028243 A1 | 2/2007 | Berry et al. | |
| 2007/0294501 A1 | 12/2007 | Wolf et al. | |

OTHER PUBLICATIONS

Noble J. et al. "Patterns for managing limited memory", *Proceedings of the Memory Preservation Society*, Sep. 13, 1998, pp. 1-32.

IBM, "Performance Management Guide", *AIX 5L Version 5.2 Documentation*, Oct. 2002, p. 160.

IBM, "Fail-Safe Message for Insufficient Memory Conditions", *IBM Technical Disclosure Bulletin*, IBM Corp. New York, vol. 37, No. 1, Jan. 1, 1994, p. 87.

\* cited by examiner

MEMORY MANAGEMENT METHODS AND SYSTEMS

This application is a continuation of U.S. application Ser. No. 12/909,751, filed Oct. 21, 2010, which is a divisional of U.S. patent application Ser. No. 11/620,688, filed on Jan. 7, 2007, now issued as U.S. Pat. No. 7,827,358.

FIELD OF INVENTION

The present invention relates generally to memory management systems. More particularly, this invention relates to reducing memory usage for multiple applications.

BACKGROUND

As more and more services are becoming available for small or mobile devices, the number of applications running in a single device has increased significantly. Usually, a small or mobile device is used mostly for certain specific applications, while being equipped with general purpose computing capabilities. For example, it is common to find a mobile phone device that also runs a browser application, a gaming application, and a music player application, etc. On the other hand, a mobile video player device may run a gaming application and/or an email application in addition to a video application. Normally, multiple running applications in the same device compete with each other by sharing the same memory space embedded inside the device.

Although the density of memory devices continues to increase, memory capacities in small or mobile devices are still very limited as their physical sizes shrink at the same time. Traditionally, virtual memory technologies are employed to allow multiple applications to share a limited RAM (random access memory) using a secondary memory with a much larger capacity. However, the capacity in a secondary memory, such as a flash memory, for a small or mobile device may also be very limited.

Usually, a system monitors memory usage by multiple running applications to ensure availability of a required capacity of free memory. In some systems, when memory usage reaches a critical level, the system takes memory management actions to increase the size of free memory, such as activating a garbage collection procedure to obtain allocated memories from applications which are no longer running. The system may also target a selected application, such as by simply killing the application. Selecting a target application is usually based on the size or age of an application. As a result, the larger the size, the more likely an application may be killed when memory usage is tight.

However, the priority among running applications in a small mobile device may not correspond to the size or age of an application. In addition, killing a running application may result in adverse user experiences on the device as a whole. Furthermore, relying on memory reduction by a single running application to reduce overall memory usage may not be effective enough or may disrupt the running state of the application. Therefore, existing memory management approaches fall short of addressing the challenges of serving multiple running applications in a small or mobile device with limited memory capacity.

SUMMARY OF THE DESCRIPTION

An embodiment of the present invention includes a method and apparatus that determine a usage level of a memory device to notify a running application to perform memory reduction operations selected based on the memory usage level. An application calls APIs (Application Programming Interface) integrated in the system to perform memory reduction operations. A memory usage level is determined according to a memory usage status received from the kernel of a system. A running application is associated with application priorities ranking multiple running applications statically or dynamically. Selecting memory reduction operations and notifying a running application may be based on application priorities.

In an alternative embodiment, an application may receive a notification about a memory usage level to reduce memory usage. The application may determine a mode of operation to directly reduce memory usage without using API calls to other software.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
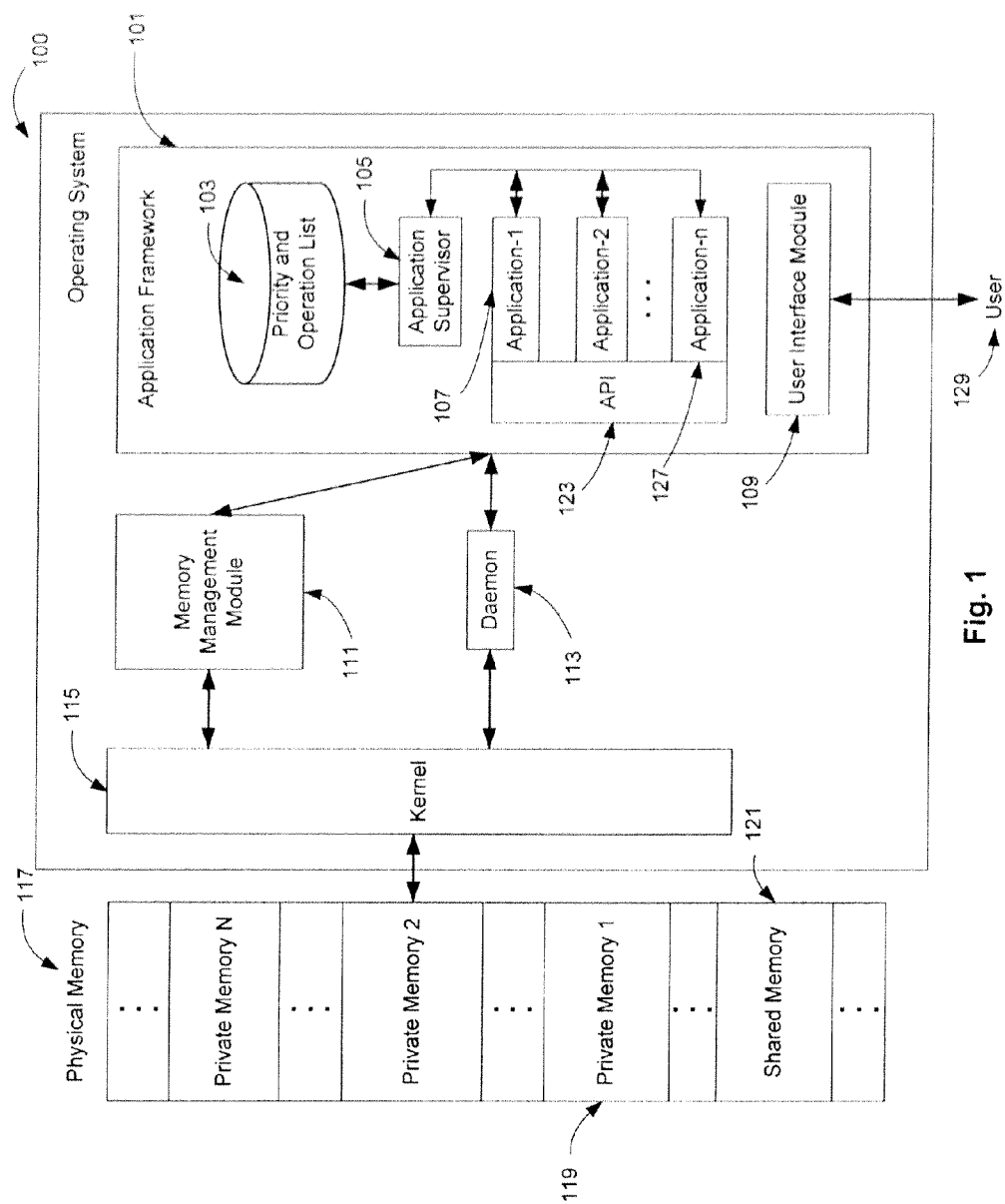
FIG. 1 is a block diagram illustrating one embodiment of a system for memory management.

A method and an apparatus for memory management are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a memory management may be designed to provide a memory management mechanism without virtual pages in an operating system for multiple applications to share a physical memory of limited capacity. When detecting a shortage of available physical memory resources, a daemon or other software components may cause notifications to be sent to running applications for performing memory reduction operations. In response, notified applications may perform corresponding memory reduction operations to increase the size of available physical memory. Collectively, the change of available physical memory size may be significant to reduce or eliminate an immediate possibility of memory shortage. In the mean time, most applications remain running with reduced memory usage without drastic impact on user experiences.

According to one embodiment, different notifications may be sent to selected or all running applications based on application priorities and/or a usage status of the memory. A usage status of the memory may be based on a set of usage watermarks. In one embodiment, a running application may be associated with an application priority according to an application priority list ranking the application among multiple applications which may be running at the same time. For example, running applications may be prioritized based on the most recent active files or pages associated, the total physical memory occupied, and/or a predetermined application priority. A running application may be associated with more than one application priorities according to multiple application priority lists. In one embodiment, applications with high priorities may receive a notification to perform memory reduction operations to yield partial cache memory occupied. While a low priority application may be asked to perform operations to yield all its occupied cache memory. Memory reduction operations may be performed through APIs (Application Programming Interfaces) integrated with an application.

FIG. 1 is a block diagram illustrating one embodiment of a system for memory management. In one embodiment, system 100 may be an operation system including a kernel 115 interfacing with a physical memory 117. The physical memory 117 may be a RAM (Random Access Memory), a flash memory or other types of memory devices compatible with system 100. Each running application, such as application-1 107 in an application framework 101 of the system 100, may be allocated a part of the physical memory 117 for its run-time use. An application may request/release memory allocations through a memory management module 111. A memory allocated for an application may be private to the application or shared together with other applications. For example, in one embodiment, application-1 107 may be allocated with a private memory 1 119 and a shared memory 121, where the private memory 1 119 is used exclusively for application-1 107 while the shared memory can be accessed by all applications including application-1 107.

In one embodiment, the system 100 may include an application framework 101 for supporting multiple running applications such as application-1, application-2, and application-n 127. A user interface module 109 may be integrated with multiple running applications through the application framework 101 for an application to interface with a user 129 using the system 100. In one embodiment, the application framework 101 may include an application supervisor 105. The application supervisor 105 may run as a background process in the system 100. In one embodiment, a priority and operation list 103 may be associated with the application supervisor 105 as part of the application framework 101. The priority and operation list 103 may be a database or a data structure storing information about application priorities. In one embodiment, a running application may register with the priority and operation list 103 when activated. In another embodiment, the application framework 101 may automatically monitor the set of running applications and updates the priority and operation list 103 accordingly. A priority list ranking currently running applications may be dynamically updated by the application framework. In one embodiment, the priority and operation list 103 may include a predetermined static priority list for critical applications.

The application supervisor 105, according to one embodiment, may receive information about a usage level of the physical memory 117 from a daemon process 113. The application supervisor may send notification messages to selected running applications according to the usage level received. In one embodiment, the notification message from the application supervisor 105 may be associated with one or more memory reduction operations based on the priority and operation list 103. The notification message may depend on the priority information associated with the target application based on the priority and operation list 103. In one embodiment, the application supervisor 105 may dynamically update a priority list in the priority and operation list 103. The application supervisor 105 may update a priority list in response to receiving information about the memory usage level. In one embodiment, a running application may perform memory reduction operations according to notification messages received from the application supervisor 105 by calling one or more APIs provided by the application framework 101. A running application such as application-1 107 may be integrated with an API library component 123 of the application framework 101. In one embodiment, the API library 123 may include the APIs corresponding to memory reduction operations.

In one embodiment, the daemon 113 may run as a background process in the system 100. The daemon may periodically send a request to the kernel 115 for a current usage status of the physical memory 117. In one embodiment, the kernel 113 may notify the daemon 115 about the current usage status of the memory 117. The kernel 115 may send the daemon 113 a usage status whenever a change of the amount of available physical memory 117 exceeds a predetermined threshold since sending the previous usage status notification. In one embodiment, the kernel may notify the daemon 113 with a current usage status of the physical memory 117 in a periodical manner. The daemon 113 may determine a usage level based on the received usage status for the physical memory 117. In one embodiment, the daemon 113 may send a message about the determined usage level to the application supervisor 105. In another embodiment, the daemon 113 may send a message including the usage status received from kernel 115 to the application supervisor 105. The daemon 113 may send message directly to a running application instead of the application supervisor 105 based on the determined usage level.

Figure 2:
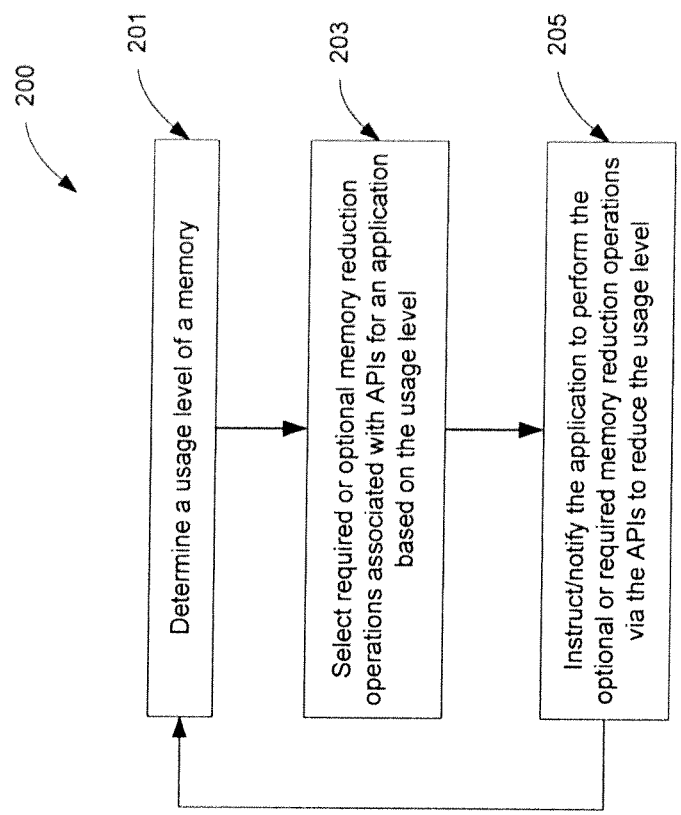
FIG. 2 is a flow diagram illustrating one embodiment of a process for memory management in accordance with the system of FIG. 1.

FIG. 2 is a flow diagram illustrating one embodiment of a process for memory management in accordance with the system of FIG. 1. Processing logic of the process 200 may determine a usage level of a memory at block 201. The memory may be a memory device such as the physical memory 117 of FIG. 1 that supports one or more running applications in a system. In one embodiment, a usage level may be derived from a usage status of the memory device. A usage status may include private memory allocations for each running application. A usage status may also include memory allocation for a shared memory. In one embodiment, a usage status may be based on a percentage of the total size of the memory device. Alternatively, a usage level may be determined based on the usage status according to a predetermined set of watermarks of the total memory usage.

At block 203, according to one embodiment, processing logic of the process 200 may select memory reduction operations for a running application based on a usage level. Each memory reduction operation may be associated with one or more APIs from an API library integrated with the application. In one embodiment, processing logic of the process 200 may perform a memory reduction operation by an application calling the associated APIs. The required memory reduction operations may be selected according to a usage level of the memory device supporting the running application. In one embodiment, a selected memory reduction operation may be optional or required for an application. The selected memory reduction operation may be required when the usage level is above a predetermined watermark of memory usage of the memory device. In one embodiment, processing logic of the process 200 may select a memory reduction operation via an application calling an API.

At block 205, according to one embodiment, processing logic of the process 200 may instruct a running application to perform optionally selected memory reduction operations. Processing logic of the process 200 may send a notification message to the running application to call the APIs associated with the memory reduction operations. In one embodiment, the notification message may include a usage level of a memory. In another embodiment, the notification message may include callbacks to the associated APIs. When the selected memory reduction operation is optional, processing logic of the process 200 considers other factors for an application to determine whether to perform a memory reduction operation. In one embodiment, a background application may be required to perform a memory reduction operation. Processing logic of the process 200 may perform memory reductions operations via an application calling APIs by executing callbacks received from a notification. In one embodiment, processing logic of the process 200 may identify whether a memory reduction operation is optional during when an application calling an API. Subsequent to instructing applications to reduce the usage level of a o y at block 205, processing logic of the process 200 may determine a new usage level of memory again at block 201.

Figure 3:
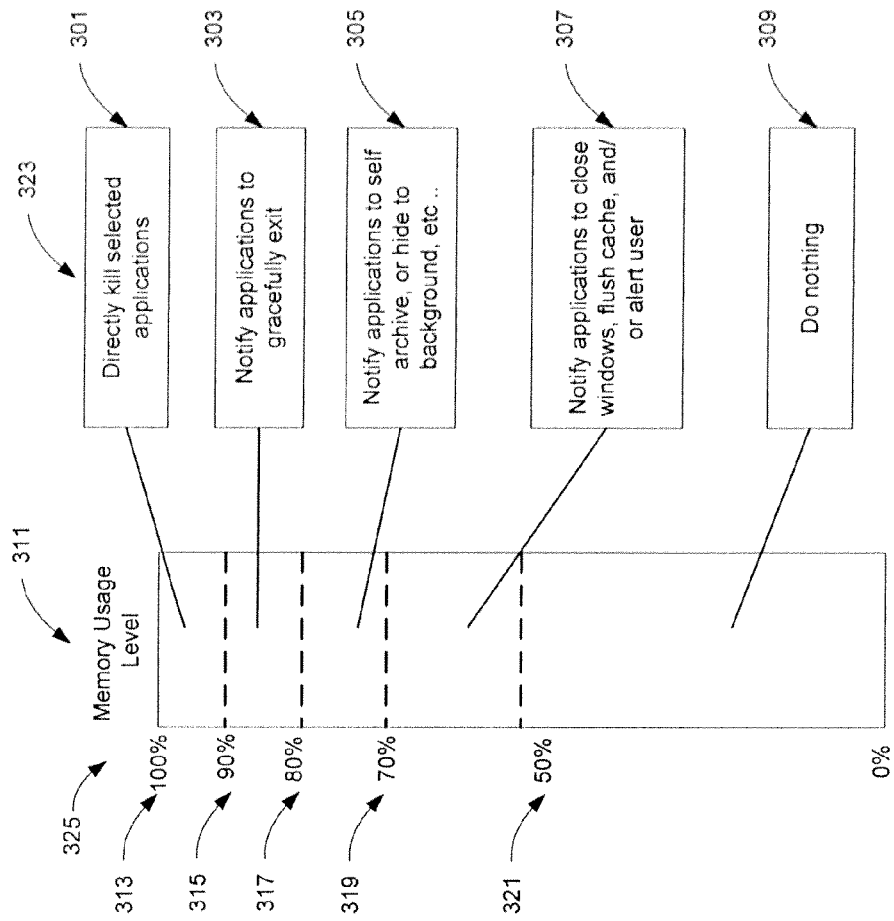
FIG. 3 illustrates an example of a usage level for a memory with watermarks associated with corresponding memory reduction operations.

FIG. 3 illustrates an example of a usage level for a memory with watermarks associated with corresponding memory reduction operations. In one embodiment, a watermark of a memory usage level 311 may represent a percentage of memory already in use with respect to the total available memory space of a memory device. For example, watermark 313 may indicate no more memory space is available for any application. In one embodiment, a memory usage level may be derived from a memory usage status received fro a system kernel. The usage level of a memory may change over time as the number of running applications accessing the memory increases or decreases. The usage level of a memory may also change as an application accessing the memory runs in different states. In one embodiment, an association may be predefined between a memory usage level 311 and a set of memory reduction operations 323 based on a plurality of watermarks 325. A memory reduction operation may be performed by a running application receiving a notification based on a memory usage level. In one embodiment, if the memory usage level may be below 50% watermark 321, no operation is needed for memory reduction. If the memory usage level is identified to be greater than 50% 321 but less then 70% watermark 319, a running application may be notified to perform memory reduction operations such as closing opened windows, flushing cache memory used and/or alerting a user to conserve memory usage 307. In one embodiment, a user may be alerted with a pop up message asking a user to close opened windows no longer needed. When the memory usage level is identified to be between 70% watermark 319 and 80% watermark 317, according to one embodiment, an application may be notified to perform memory reduction operations such as self archiving or hiding itself from a foreground application to a background application 305. Self archiving (freezing dry) may cause a running application to enter into a hibernated state in a condensed format which requires much less memory space than required to support a current state of the running application. In one embodiment, when the memory usage level is identified to be between 80% watermark 317 and 90% watermark 315, an application may be notified to exit a system gracefully 303 including allowing a user to save application data. When the memory usage level is identified to be above watermark 90% 315, according to one embodiment, selected applications may be killed directly to reduce memory usage level 301. An application may be selected to be killed based on an associated application priority. In one embodiment, a running application associated with the lowest application priority based on a predetermine priority list may be selected to be killed.

Figure 4:
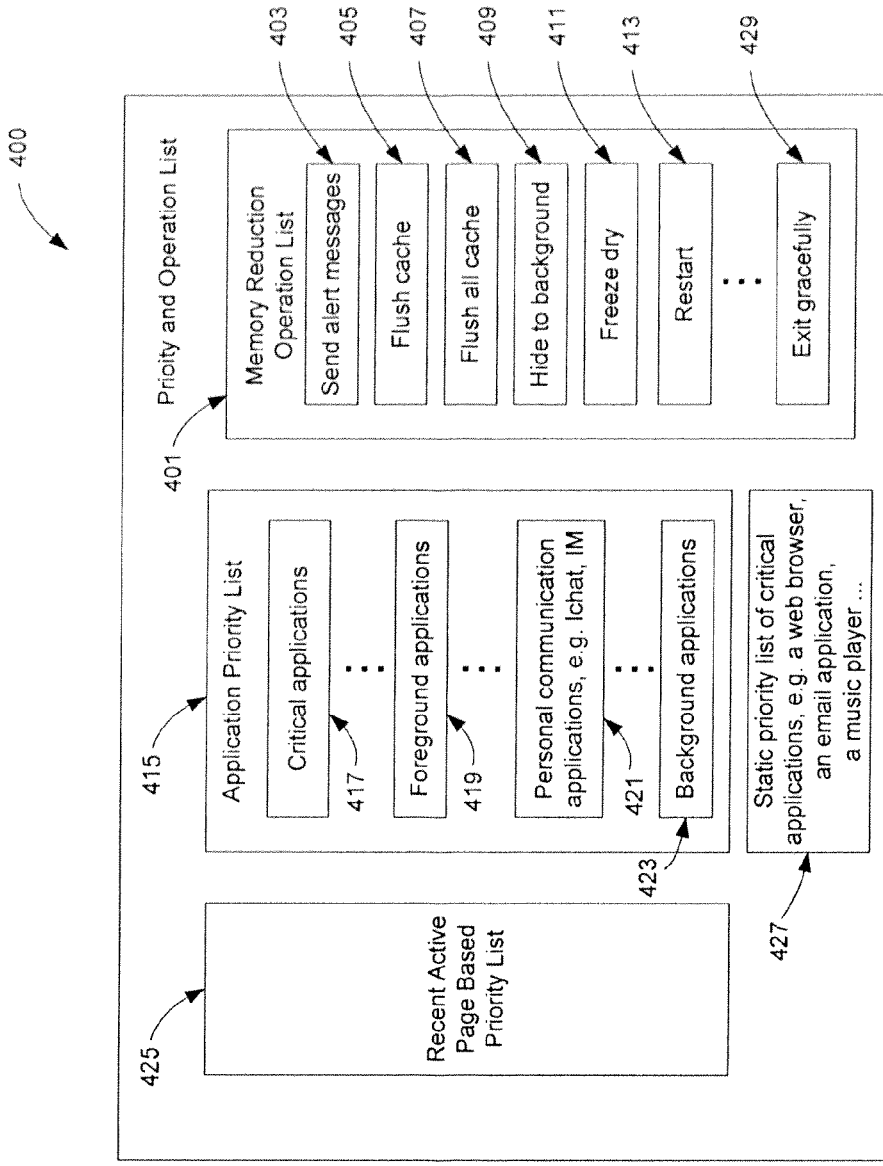
FIG. 4 is a block diagram illustrating an embodiment of a priority and operation list in accordance with the system of FIG. 1.

FIG. 4 is a block diagram illustrating an embodiment of a priority and operation list in accordance with the system of FIG. 1. The priority and operation list 400 may include static lists and dynamically lists. In one embodiment, a static list may be predetermined according to settings of a system such as shown in FIG. 1. A dynamic list may be updated during the operation of a system. In one embodiment, static lists may include a list of critical applications 427 and/or a list of memory reduction operations 401. Critical applications may be, for example, an internet web browser, an electronic mail application, or a music player, etc. A memory reduction operation may be sending alert messages 403 for users to conserve memory usage, flushing a portion of cache memory 405 currently in use by an application, flushing all cache memory 407 currently in use by an application, hiding to a background application from a foreground application 409, freezing dry 411 by entering into a hibernated state in a condensed format, restarting an existing application 413, or exiting the system gracefully 429. These various actions may be invoked by the application's calling of an API to perform various operations such as flushing some or all of the application's caches; hiding the application to the background; closing one or more windows of the application; restarting the application; and/or "freeze drying" the application state for later restoration when the application is run again. In other embodiments, the application itself may perform one or more of these actions or operations to reduce memory usage without calling an API.

In one embodiment, an application priority list 415 may be a dynamic list in a priority and operation list 400. Dynamic lists ay be updated through an application framework such as shown in FIG. 1. In one embodiment, dynamic lists may be updated by the application supervisor 105 of FIG. 1. Updates to dynamic lists may occur in response to activating an application and/or receiving a usage level of a memory by an application framework such as shown in FIG. 1. In one embodiment, periodic updates to dynamic lists may be scheduled according to a preset period. The application priority list 415 may include a ranking among currently running applications according to whether a running application is a critical application 417, a foreground application 419, a specific type of application such as a personal communication application 421 or a background application 423. A personal communication application may be, for example, an instant messaging or SMS (Short Message Service) application. In one embodiment, special types of applications may be designated according to a predetermined static list in the priority and operation list 400. In one embodiment, a dynamic priority list 425 may be based on recent active page associated with a running application. The more recent the time stamp of an active page associated with a running application, according to one embodiment, the higher the corresponding priority may be in the priority list 425.

Figure 5:
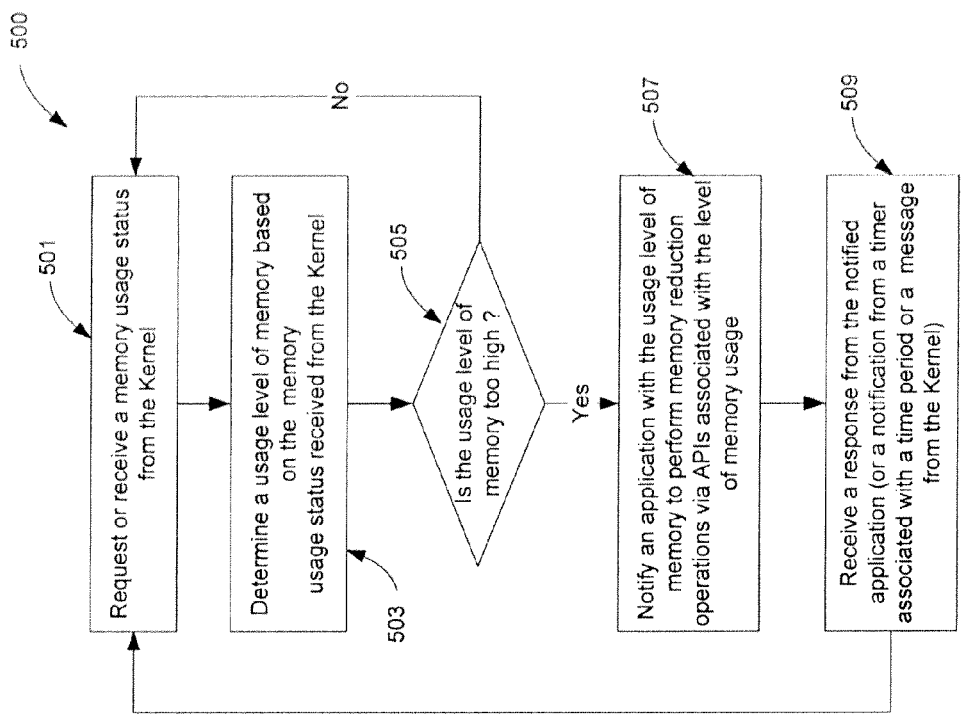
FIG. 5 is a flow diagram illustrating one embodiment of a process performed by a daemon for memory management in accordance with the system of FIG. 1.

FIG. 5 is a flow diagram illustrating one embodiment of a process 500 performed by a daemon for memory management in accordance with the system of FIG. 1. At block 501, according to one embodiment, processing logic for process 500 may request a memory usage status from a system kernel. Processing logic for process 500 may receive the memory usage status in response to the request or based on a message sent by the system kernel. The memory usage status may include private and shared memory allocation information for a running application. In one embodiment, at block 503, processing logic for process 500 may determine a usage level of memory based on the received memory usage status from the system kernel. The usage level may be based on a comparison between a sum of amount of memory allocated for running applications and a maximum available capacity of a memory device. In one embodiment, processing logic may determine whether the usage level of memory is too high at block 505. Processing logic for process 500 may determine a usage level of memory too high according to a set of watermarks, such as shown in FIG. 3. If the usage level is determined as being too high, processing logic for process 500 may proceed at block 507. Otherwise, processing logic returns at block 501. In one embodiment, the usage level of memory may be too high if exceeding a 50% watermark.

At block 507, according to one embodiment, processing logic for process 500 notifies a running application to perform memory reduction operations associated with the usage level of memory. The notification from processing logic for process 500 may include the usage level of memory. Processing logic for process 500 may indirectly notify a running application by sending a message including the usage level of memory to an application framework associated with the running application such as shown in FIG. 1. In one embodiment, the notification may be sent to all running applications. In another embodiment, the notification may be sent to a selected set of running applications. The selection may be based on application priority list as shown in FIG. 4. At block 509, according to one embodiment, processing logic of process 500 may receive a response from a running application notified to perform memory reduction operations. In another embodiment, processing logic of process 500 may receive a notification from a timer periodically at block 509. Processing logic of process 500 may receive a notification directly from the system kernel. Subsequent to receiving a response or a notification at block 509, processing logic of process 500 may return back to block 501.

Figure 6:
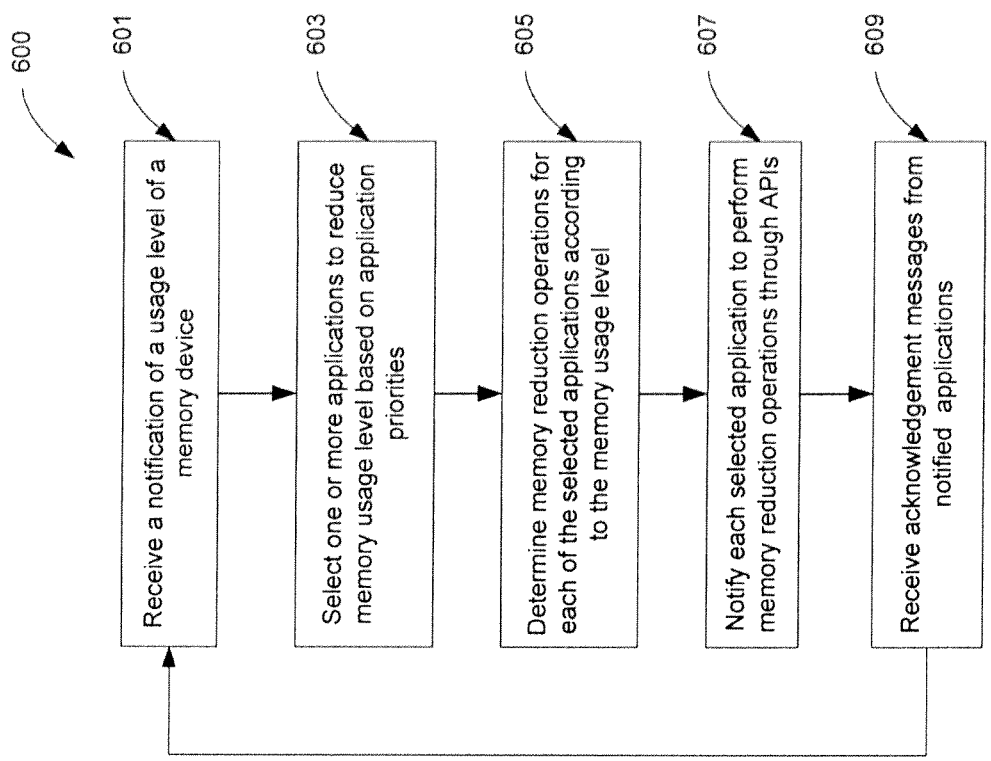
FIG. 6 is a flow diagram illustrating an embodiment of a process that selects applications according to application priorities to perform memory reduction operations in accordance with the system of FIG. 1.

FIG. 6 is a flow diagram illustrating an embodiment of a process 600 that selects applications according to application priorities to perform memory reduction operations in accordance with the system of FIG. 1. At block 601, according to one embodiment, processing logic of process 600 may receive a notification of a usage level of a memory device. Processing logic of process 600 may ignore the notification if the usage level is not high. In one embodiment, only notifications associated with a high usage level of memory may be received at block 601. At block 603, processing logic of process 600 may select one or more applications currently running to reduce memory usage level. In one embodiment, the selection may be based on application priorities. A running application may be associated with a priority based on an application priority list stored in a data structure such as shown in FIG. 4. In one embodiment, a running application may be associated with more than one application priority lists. Processing logic of process 600 may select one application priority list to determine a priority of an application based on the memory usage level. In one embodiment, processing logic of process 600 may combine multiple application priority lists to determine a priority of an application. Processing logic of process 600 may assign a highest priority to a critical application such as shown in FIG. 4 without considering other priority lists. In one embodiment, the selected applications may include a fixed number of the running applications associated with the lower priorities.

At block 605, according to one embodiment, processing logic of process 600 determines a set of memory reduction operations for a selected running application according to the memory usage level. A memory reduction operation may be selected based on association with preset watermarks of memory usage levels as shown in FIG. 3. In one embodiment, more than on memory reduction operations may be selected for a running application. In another embodiment, one memory reduction operation may be selected for a running application. An application may be assigned a memory reduction operation randomly selected from a group of operations determined based on the memory usage level. In one embodiment, processing logic of process 600 may notify each selected application to perform assigned memory reduction operations by calling APIs at block 607. The notification received by a selected application may include callbacks to call APIs for performing memory reduction operations. In another embodiment, the notification may include the memory usage level. Processing logic of process 600 may notify a selected running application according to a messaging mechanism of an application framework associated with the selected running application. At block 609, according to one embodiment, processing logic of process 600 may receive acknowledgement messages from notified applications. Processing logic of process 600 may proceed at block 601 after receiving all acknowledgement messages. In another embodiment, processing logic of process 600 may return to block 601 after a preset period of time.

Figure 7:
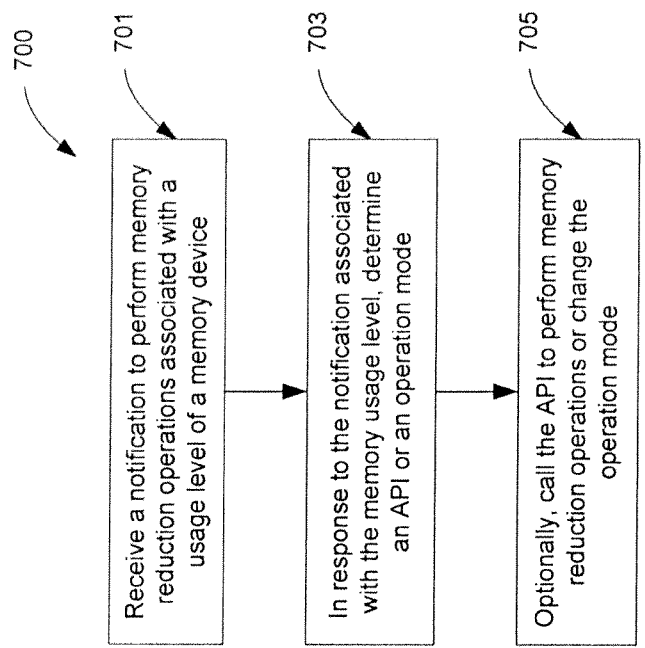
FIG. 7 is a flow diagram illustrating an embodiment of a process to perform memory reduction operations in response to a notification in accordance with the system of FIG. 1.

FIG. 7 is a flow diagram illustrating an embodiment of a process 700 to perform memory reduction operations in response to a notification in accordance to the system of FIG. 1. At block 701, according to one embodiment, processing logic of 700 may receive a notification to perform memory reduction operations associated with a usage level of a memory device. A memory reduction operation, for example, may be selected from the memory reduction operation list as shown in FIG. 4. The notification may include callbacks to APIs that cause processing logic of process 700 to perform memory reduction operations. In one embodiment, the notification may include a memory usage level. Processing logic of process 700 may determine an API in response to the notification received at block 703. In one embodiment, the API may be determined based on the memory usage level associated with the notification. In another embodiment, determining an API may be embedded in the callbacks included in the notification. Processing logic of process 700 may determine not to perform memory reduction operations at block 703. In one embodiment, processing logic of process 700 may call a default API that determines an API to perform memory reduction operations. At block 705, according to one embodiment, processing logic of process 7000 may call the API determined at block 703 to perform associated memory reduction operations.

Alternatively, in another embodiment, processing logic of process 700 may determine a mode of operation at block 703 based on the notification received. A mode of operation may be to minimize memory usage. Processing logic of process 700 may change the mode of operation at block 705 accordingly. In one embodiment, processing logic of process 700 may deallocate a portion of memory storing a value at a memory location according to a mode of operation. The value may be a result of an earlier execution of a set of instructions by processing logic of the process 700. The value may be a computed value. Alternatively, the value may be fetched remotely. In one embodiment, processing logic of the process 700 may repeat executing the same set of instructions to obtain the same value when referenced based on a mode of operation to minimize memory usage. Processing logic of the process 700 may fetch from a memory location storing the value when referenced according to another mode of operation to maximize speed.

Figure 8:
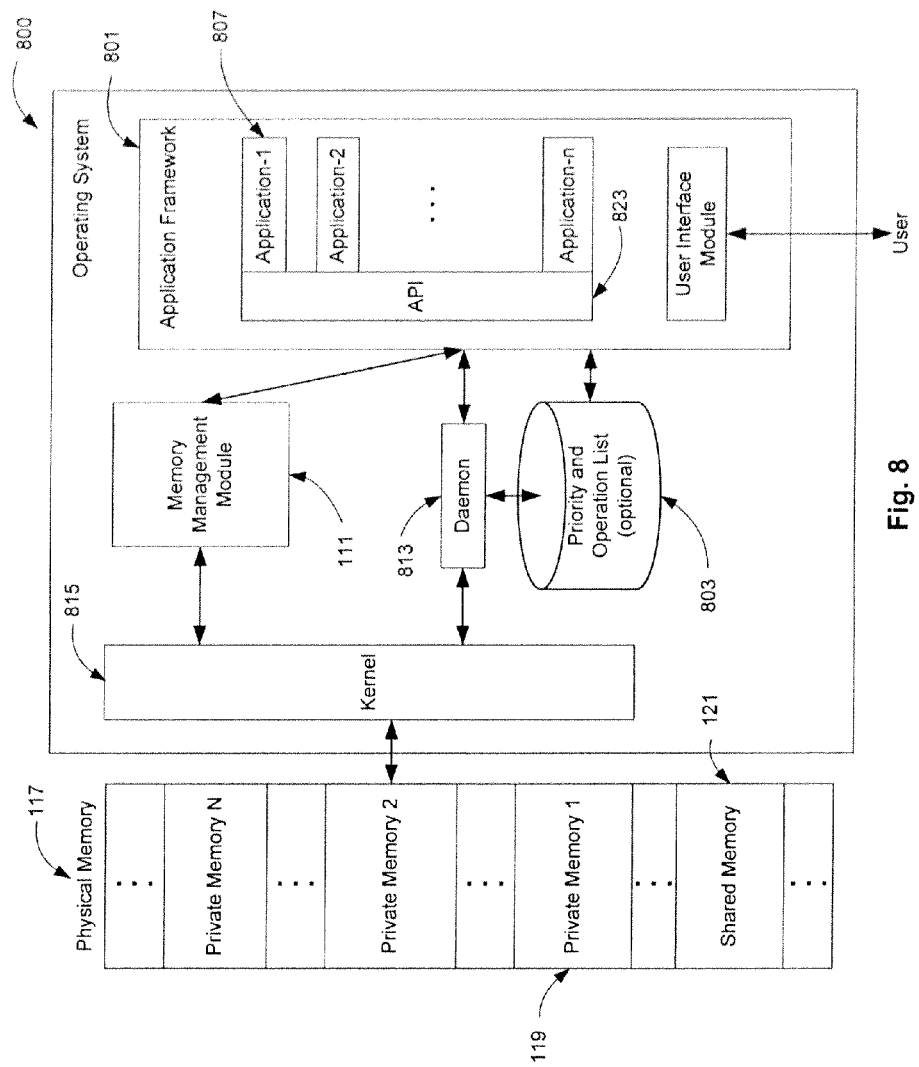
FIG. 8 is a is a block diagram illustrating another embodiment of a system for memory management.

FIG. 8 is a block diagram illustrating another embodiment of a system for memory management. In one embodiment, the system 800 may include a daemon 803 optionally associated with a priority and operation list 803. The daemon 803 may be running as a background process in the system 800. The priority and operation list 803 may be a database or a data structure maintained by an application framework 801. The priority and operation list 803 may include preset static list of memory reduction operations and dynamically updated lists of running applications such as shown in FIG. 4. In one embodiment, the daemon 803 may request application priority information from the kernel process 815 for a running application in the application framework 801. In another embodiment, a running application such as application-1 807 may be integrated with an API library 823 of the application framework 801. In one embodiment, the API library 823 ay include a selection API associated with application priorities. The API library 823 may include APIs for performing memory reduction operations as listed in the priority and operation list 803. The change of the mode of operation may be performed either by calling an API to reduce memory usage or by the application itself changing the mode without calling an API.

In one embodiment, the daemon 803 may be a process receiving memory usage status from the system kernel 815. The daemon 803 may determine a memory usage level based on the memory usage status received. In one embodiment, the daemon may send notifications including the determined memory usage level to all applications to perform memory reduction operations by calling the selection API of the API library 823. Each running application calling the selection API may determine to perform one or more memory reduction operations based on the memory usage level. A running application may perform memory reduction operations by calling APIs associated with the memory reduction operations. A running application may determine not to perform a memory reduction operation according to an associated application priority and the memory usage level. In another embodiment, the daemon 813 may select one or more running applications to perform memory reduction operations according to application priorities from the priority and operation list 803. The daemon may select one or more memory reduction operations for a selected application according to the list of memory reduction operations in the priority and operation list 803.

Figure 9:
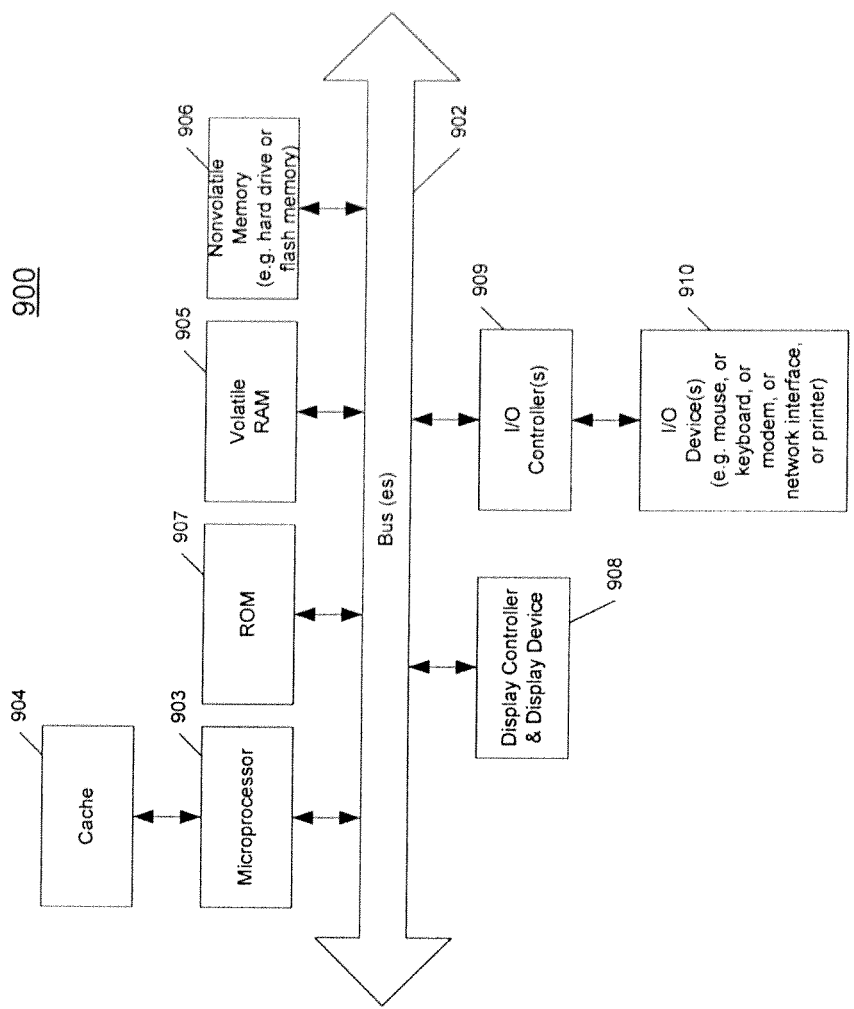
FIG. 9 illustrates one example of a typical computer system which may be used in conjunction with the embodiments described herein.

FIG. 9 shows one example of a computer system which may be used with one embodiment the present invention. For example, the system 900 may be implemented as a part of the systems shown in FIGS. 1 and 8. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 9, the computer system 901, which is a form of a data processing system, includes a bus 903 which is coupled to a microprocessor(s) 905 and a ROM (Read Only Memory) 907 and volatile RAM 909 and a non-volatile memory 911. The microprocessor 903 may retrieve the instructions from the memories 907, 909, 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent fro the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize fro such discussion, the accompanying drawings and the claims that various modifications can be made without departing from the spirit and scope of the invention.

What is claimed is:

1. A machine readable non-transitory storage medium having instructions which, when executed by a machine, cause the machine to perform a method comprising:
   determining a usage level of a memory based on a memory usage determined by an operating system, the usage level based on an amount of memory already in use, wherein the usage level is one of a plurality of usage levels;
   selecting one or more applications from a set of applications which are using the memory;
   notifying the selected one or more applications of the usage level via an API (Application Programming Interface) to notify the selected one or more applications to perform a memory reduction operation, wherein the API includes the usage level;
   wherein the selected one or more a applications are selected based on a dynamic priority list and wherein the plurality of usage levels include a first usage level which represents a first level of requested memory reduction, and a second usage level which represents a second level of requested memory reduction which is greater than the first level of requested memory reduction.

2. The medium as in claim 1 wherein the selected one or more applications are selected based on a recency based priority list which is dynamic and wherein the memory reduction operation is optional and wherein the notifying includes providing a notification that includes the usage level and using a callback and wherein the machine uses a memory management system that operates without using virtual pages.

3. The medium as in claim 2 wherein the memory reduction operation includes archiving a state of an application in a condensed format.

4. The medium as in claim 1 wherein the selected one or more applications are selected based on a dynamic priority list and wherein the usage level is a numerical value which is related to the amount of memory already in use that is determined prior to the notifying.

5. The medium as in claim 1, wherein a first group of the selected one or more applications are notified with a first notification that specifies the first usage level and a second group of the selected one or more applications are notified with a second notification that specifies the second usage level.

6. The medium as in claim 5 wherein the first notification includes a callback to call an API and the second notification includes a callback to call an API.

7. The medium as in claim 6 wherein the memory reduction operation is optional.

8. The medium as in claim 7 wherein the memory reduction operation includes archiving a state of an application in a condensed format.

9. The medium as in claim 8 wherein the machine uses a memory management system that operates without using virtual pages.

10. The medium as in claim 1 wherein different usage levels represent different amounts of memory in use.

11. The medium as in claim 1 wherein the dynamic priority list includes a set of critical user applications that have a static, high priority.

12. A machine implemented method comprising:
determining a usage level of a memory based on a memory usage determined by an operating system, the usage level based on an amount of memory already in use, wherein the usage level is one of a plurality of usage levels;
selecting one or more applications from a set of applications which are using the memory;
notifying the selected one or more applications of the usage level via an API (Application Programming interface) to notify the selected one or more applications to perform a memory reduction operation, wherein the API includes the usage level;
wherein the selected one or more applications are selected based on a dynamic priority list and wherein the plurality of usage levels include a first usage level which represents a first level of requested memory reduction, and a second usage level which represents a second level of requested memory reduction which is greater than the first level of requested memory reduction.

13. The method as in claim 12 wherein the selected one or more applications are selected based on a recency based priority list which is dynamic and wherein the memory reduction operation is optional and wherein the notifying includes providing a notification that includes the usage level and using a callback and wherein the machine uses a memory management system that operates without using virtual pages.

14. The method as in claim 13 wherein the memory reduction operation includes archiving a state of an application in a condensed format.

15. The method as in claim 12 wherein the selected one or more applications are selected based on a dynamic priority list and wherein the usage level is a numerical value which is related to the amount of memory already in use that is determined prior to the notifying.

16. The method as in claim 12 wherein a first group of the selected one or more applications are notified with a first notification that specifies the first usage level and a second group of the selected one or more applications are notified with a second notification that specifies the second usage level.

17. The method as in claim 16 wherein the first notification includes a callback to call an API and the second notification includes a callback to call an API.

18. The method as in claim 17 wherein the memory reduction operation is optional.

19. The method as in claim 12 wherein different usage levels represent different amounts of memory in use.

20. The method as in claim 12 wherein the machine uses a memory management system that operates without using virtual pages.

21. A machine readable non-transitory storage medium having instructions which, when executed by a machine, cause the machine to perform method comprising:
determining a usage level of a memory based on a memory usage determined by an operating system, the usage level based on an amount of memory already in use, wherein the usage level is one of a plurality of usage levels;
selecting one or more applications from a set of applications which are using the memory;
notifying the selected one or more applications via an API (Application Programming Interface) call of a need for the selected one or more applications to perform a memory reduction operation, wherein the API call includes the usage level;
wherein the selected one or more applications are selected based on a dynamic priority list and wherein the plurality of usage levels include a first usage level, which represents a first level of requested memory reduction and a second usage level which represents a second level of requested memory reduction which is greater than the first level of requested memory reduction.

22. The medium as in claim 21 wherein the selected one or more applications are selected based on a recency based priority list which is dynamic and wherein the memory reduction operation is optional and wherein the notifying includes providing a notification that includes the usage level and using a callback and wherein the machine uses a memory management system that operates without using virtual pages.

23. The medium as in claim 22 wherein the memory reduction operation includes archiving a state of an application in a condensed format.

24. The medium as in claim 21 wherein the selected one or more applications are selected based on a dynamic priority list and wherein the usage level is a numerical value which is related to the amount of memory reduction that is requested by the notifying.

25. The medium as in claim 21 wherein a first group of the selected one or more applications are notified with a first notification that specifies the first usage level and a second group of the selected one or more applications are notified with a second notification that specifies the second usage level.

26. The medium as in claim 25 wherein the first notification includes a callback to call an API call and the second notification includes a callback to call an API call.

27. A machine readable non-transitory storage medium having instructions which, when executed by a machine, cause the machine to perform a method comprising:

determining, by an operating system, an amount of memory already in use;

maintaining a dynamic priority list of a set of applications that are using the memory, the dynamic priority list specifying an application's priority among the other applications in the set of applications, wherein a first application in the set of applications has a first priority and a second application in the set of applications has a second priority which is less than the first priority;

providing a first message to the first application via an API to notify the first application of a need to perform a memory reduction operation, wherein the first message includes a first level that is based on the first priority;

providing a second message to the second application via an API to notify the second application of a need to perform a memory reduction operation, wherein the second message includes a second level that is based on the second priority;

wherein the first message and the second message are provided in response to determining that the amount of memory already in use is too high;

wherein the memory reduction operation is optional;

wherein the machine uses a memory management system that operates without using virtual pages;

wherein the first level represents a first amount of requested memory reduction and the second level represents a second amount of requested memory reduction which is greater than the first amount of requested memory reduction and wherein the first message includes a callback to call an API call and the second message includes a callback to call an API call.

28. The medium as in claim 27 wherein at least one of the memory reduction operations includes archiving a state of an application in a condensed format.

29. A machine readable non-transitory storage medium having instructions which, when executed by a machine, cause the machine to perform a method comprising:

receiving, by an application, a notification from an operating system on the machine, the notification including a usage level which is related to an amount of memory already in use, the usage level being one of a plurality of usage levels which represent different levels of application priorities, and the notification includes a callback API;

calling, by the application in response to the notification, an API to reduce memory usage;

wherein the application is selected to receive the notification based on a recency based priority list that is dynamic;

wherein the machine uses a memory management system that operates without using virtual pages;

wherein the plurality of usage include a first usage level, represents a first level of requested memory reduction, and a second usage level which represents a second level of requested memory reduction which is greater than the first level of requested memory reduction.

30. The medium as in claim 29, the method further comprising:

deallocating, by the application, memory used by the application in response to the notification.

31. The medium as in claim 30 wherein the amount of memory deallocated is based upon the usage level in the notification.

32. The medium as in claim 29, the method further comprising:

archiving a state of the application in a condensed format.

33. The medium as in claim 29 wherein the notification includes a callback to call an API call and a second notification includes a callback to call an API call.

* * * * *